United States Patent [19]

Takahashi

[11] Patent Number: 5,801,668
[45] Date of Patent: Sep. 1, 1998

[54] SMALL HAND-HELD ELECTRONIC APPARATUS WITH FIELD EFFECT LIGHT EMITTING DEVICE

[75] Inventor: Tomohiro Takahashi, Chiba, Japan

[73] Assignee: Seiko Instruments Inc., Japan

[21] Appl. No.: 648,569

[22] Filed: May 16, 1996

[30] Foreign Application Priority Data

May 19, 1995 [JP] Japan .................... 7-121660

[51] Int. Cl.⁶ .................................................. B08B 5/36
[52] U.S. Cl. .......................... 345/36; 345/39; 345/44; 345/45; 345/55; 345/76
[58] Field of Search ........................ 259/88, 89; 345/36, 345/39, 44, 45, 55, 76

[56] References Cited

U.S. PATENT DOCUMENTS

| | | | |
|---|---|---|---|
| 3,911,423 | 10/1975 | Arndt et al. | 340/324 |
| 3,992,873 | 11/1976 | Awalt | 58/50 |
| 4,298,869 | 11/1981 | Okano | 340/782 |
| 4,420,711 | 12/1983 | Takahashi | 315/296 |
| 5,155,615 | 10/1992 | Tagawa | 359/213 |
| 5,349,269 | 9/1994 | Kimball | 315/169.3 |
| 5,612,549 | 3/1997 | Nelson et al. | 257/88 |

FOREIGN PATENT DOCUMENTS 372181  6/1990  European Pat. Off. .

Primary Examiner—Raymond J. Bayerl
Assistant Examiner—Vincent E. Kovalick
Attorney, Agent, or Firm—Adams & Wilks

[57] ABSTRACT

A small hand-held electronic apparatus with a field effect light emitting device wherein the life of an EL panel is expanded; light emitting efficiency is improved; the circuit is made compact; and the number of parts is reduced. When a control signal from a charge/discharge frequency control means becomes a low level, a first step-up selection SW is turned on and a first discharge means is turned off. At this time, a step-up device and a first step-up means are connected, and the first step-up means starts a step-up operation in response to a step-up clock signal. A reverse induction voltage generated by the step-up operation is rectified by a first rectifier means and is input to a light emitting device. The light emitting device charges and accumulates reverse induction voltage input at each clock of the step-up clock and emits light to provide an illuminating function. When the control signal is switched from the low level to the high level, the first step-up selection SW is turned off and the first discharge means is turned on. Thus, the accumulated charge is discharged. The same operation is continuously performed thereafter. As a result, the light emitting device emits light continuously to serve as an illumination device.

4 Claims, 4 Drawing Sheets

SMALL HAND-HELD ELECTRONIC APPARATUS WITH FIELD EFFECT LIGHT EMITTING DEVICE

BACKGROUND OF THE INVENTION

The present invention relates to small hand-held electronic apparatuses incorporating a field effect light emitting device such as an electro-luminescence panel (hereinafter referred to as "EL panel") as a light source and, more particularly, to apparatuses such as electronic timepieces which are driven by a low voltage source.

Conventional small hand-held electronic apparatuses such as electronic timepieces have incorporated a small incandescent lamp as a display illuminating device or have used a light emitting diode (LED) as illumination for display. With such linear light sources, it has been difficult to read an area of a certain extent entirely. In some apparatuses, luminous paint has been applied in stead of illumination. However, this has not made display recognizable enough because of the small amount of light.

Under such circumstances, surface light emitting devices such as EL panels utilizing emission caused by the application of an electric field have come into use as illumination devices for small hand-held electronic apparatuses (which have mostly incorporated an LCD panel). Since an AC electric field of several tens volts or more must be applied to such an EL panel to cause it to emit light, a small hand-held electronic apparatus or the like whose battery voltage is 1.5 volts or 3 volts incorporates a step-up circuit to generate several tens volts as described above.

A common example of a step-up circuit is a circuit wherein a reverse induction voltage is generated by turning on and off the current flowing through the step-up coil utilizing the inductance of the coil. Methods for applying a high voltage pulse produced by this reverse induction voltage to an EL panel include the so-called monopolar driving system wherein one of the terminals of an EL panel is fixed to a ground level and the high voltage pulse is applied to the other terminal. Although this system can be configured using one step-up coil and one step-up circuit, it has had a problem in that the life of an EL panel as a device is shortened due to DC components applied to the EL panel and in that the reverse induction voltage in a single direction must be sufficiently high in order to provide predetermined luminosity.

Methods for eliminating such DC components to decrease the required reverse induction voltage relatively include the so-called bipolar driving system wherein a high voltage pulse is alternately applied to each of the two terminals of an EL panel. However, when this system is configured using two step-up coils and two step-up circuits, a problem has arisen in that it needs an additional step-up coil occupying a large volume of space, which makes it difficult to provide a compact apparatus.

SUMMARY OF THE INVENTION

It is an object of the present invention to provide a small hand-held electronic apparatus with a field effect light emitting device wherein the bipolar driving of an EL panel is accomplished using a single step-up coil to expand the life of the EL panel, to improve light emitting efficiency, to make the circuit compact, and to reduce the number of parts.

In order to achieve the above-mentioned object, the present invention employs a configuration of a small hand-held electronic apparatus incorporating a light emitting device utilizing the emission of light caused by the application of an electric field, including: a light emitting device having at least two terminals for accumulating electrical charge injected by a high voltage pulse applied to one of the two terminals; a step-up means having a step-up device for generating the high voltage pulse applied to the light emitting device in response to a predetermined drive frequency signal; a step-up switching means for selecting either of the two terminals of the light emitting device to which the high voltage pulse generated by the step-up means is applied and for switching the terminal under application at predetermined intervals; a plurality of discharge means connected to each of the two terminals of the light emitting device for selectively discharging the charge accumulated in the light emitting device from one of the two terminals at predetermined intervals; a step-up frequency control means for generating the predetermined drive frequency signal input to the step-up means; and a charge/discharge frequency control means for generating a selection switching signal at predetermined intervals which controls the step-up switching means and a selection switching signal at predetermined intervals which controls the discharge means.

In a small hand-held electronic apparatus with a light emitting device having the above-described configuration, the bipolar driving of the light emitting device can be accomplished using a single step-up device through repeated charging and discharging operations performed by controlling the step-up switching means for switching at predetermined intervals and by alternately applying the high voltage pulse generated by the step-up means to the two terminals of the light emitting device at predetermined intervals.

DETAILED DESCRIPTION OF THE PREFERRED EMBODIMENTS

An embodiment of the present invention will now be described with reference to the drawings.

Figure 1:
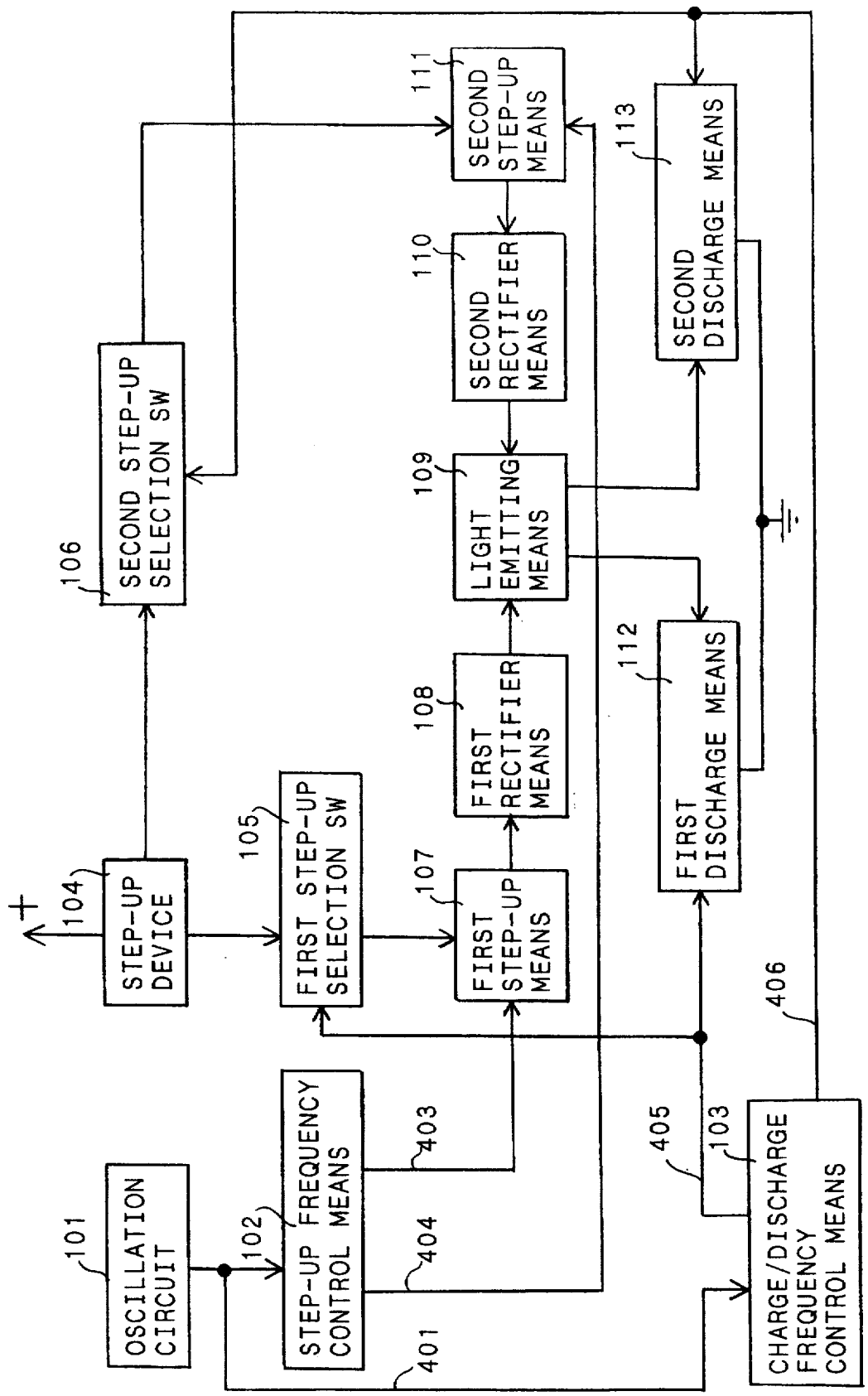
FIG. 1 is a block diagram showing an embodiment of the present invention.

FIG. 1 is a block diagram showing an embodiment of the present invention. An oscillation circuit 101 starts oscillating as a result of the application of a power supply thereto to output an oscillation clock signal 401. The oscillation clock signal 401 output by the oscillation circuit 101 is input to a step-up frequency control means 102 and a charge/discharge frequency control means 103.

In accordance with the oscillation clock signal 401, the step-up frequency control means 102 controls a step-up frequency and outputs a step-up clock signal 403 and a step-up clock signal 404. The step-up clock signal 403 is input to a first step-up means 107. The step-up clock signal 404 is input to a second step-up means 111.

In response to the input of the oscillation clock signal 401 from the oscillation circuit 101, the charge/ discharge frequency control means 103 outputs a control signal 405 and a control signal 406 for controlling charge and discharge frequencies. The control signal 405 is input to a first step-up selection SW (switch) 105 and a first discharge means 112. The control signal 406 is input to a second step-up selection SW (switch) 106 and a second discharge means 113.

When the control signal 405 from the charge/discharge frequency control means 103 becomes a low level, the first step-up selection SW 105 is turned on and the first discharge means 112 is turned off. When the first step-up selection SW 105 is turned on, a step-up device 104 and the first step-up means 107 are connected. For example, the step-up device 104 is constituted by a step-up coil. When the step-up device 104 and the first step-up means 107 are connected, the first step-up means 107 starts a step-up operation in response to the step-up clock signal 403. A reverse induction voltage (step-up voltage) generated by the step-up operation of the first step-up device 104 and the first step-up means 107 is input to a first rectifier means 108.

The reverse induction voltage input to the first rectifier means 108 is rectified and is input to a light emitting device 109. The light emitting device 109 charges and accumulates reverse induction voltage input at each clock of the step-up clock signal 403. The electric field of the reverse induction voltage input at each clock causes the light emitting device 109 to emit light, thereby providing an illuminating function. For example, the first rectifier means 108 is constituted by a diode, and the light emitting device 109 is constituted by an electroluminescence panel (EL panel).

This step-up operation continues until the control signal 405 becomes a high level. When the control signal 405 is switched from the low level to the high level, the first step-up selection SW 105 is turned off and the first discharge means 112 is turned on.

When the first step-up selection SW 105 is turned off, the step-up device 104 and the first step-up means 107 are disconnected. At this time, the step-up clock signal 403 output by the step-up frequency control means 102 becomes the low level, and the first step-up means 107 stops the step-up operation. When the first discharge means 112 is turned on, the charge accumulated in the light emitting device 109 is discharged.

When the control signal 405 output by the charge/ discharge frequency control means 103 becomes the high level and the charge accumulated in the light emitting device 109 is discharged, the control signal 406 outputs the low level. The control signal 406 output by the charge/discharge frequency control means 103 is input to the second step-up selection SW 106 and the second discharge means 113.

When the low level signal of the control signal 406 is input to the second step-up selection SW 106, the second step-up selection SW 106 is turned on. When the second step-up selection SW 106 is turned on, the step-up device 104 and the second step-up means 111 are connected this time. When the low level signal of the control signal 406 is input to the second discharge means 111, the second discharge means 111 is turned off.

When the step-up device 104 and the second step-up means 111 are connected, the step-up clock signal 404 is output by the step-up frequency control means 102. The step-up clock signal 404 output by the step-up frequency control means 102 is input to the second step-up means 111. In response to the step-up clock signal 404, the second step-up means 111 performs a step-up operation to generate a reverse induction voltage (step-up voltage) from the step-up device 104.

The reverse induction voltage generated by the step-up device 104 is input to a second rectifier means 110. The reverse induction voltage rectified by the second rectifier means 110 is input to the light emitting device 109. The light emitting device 109 charges and accumulates reverse induction voltage input at each clock of the step-up clock 404. The electric field of the reverse induction voltage input at each clock causes the light emitting device 109 to emit light, thereby providing an illuminating function. This operation continues until the control signal 406 becomes the high level.

When the control signal 406 becomes the high level, the second step-up selection SW 106 is turned off and the second discharge means 113 is turned on. When the second step-up selection SW is turned off, the step-up device 104 and the second step-up means 111 are disconnected. When the step-up device 104 and the second step-up means 111 are disconnected, the step-up clock signal 404 output by the step-up frequency control means 102 becomes the low level, and the second step-up means 111 stops the operation.

When the second discharge means 113 is turned on, the charge accumulated in the light emitting device 109 is discharged.

When the charge accumulated in the light emitting device 109 is discharged, the control signal 405 output by the charge/discharge frequency control means 103 outputs the low level again.

Such operations are continuously performed and, as a result, the light emitting device 109 emits light continuously to serve as an illumination device.

The details of the operation of the present invention as an illumination device will now be described with reference to specific examples of the circuits thereof and a timing chart.

Figure 2:
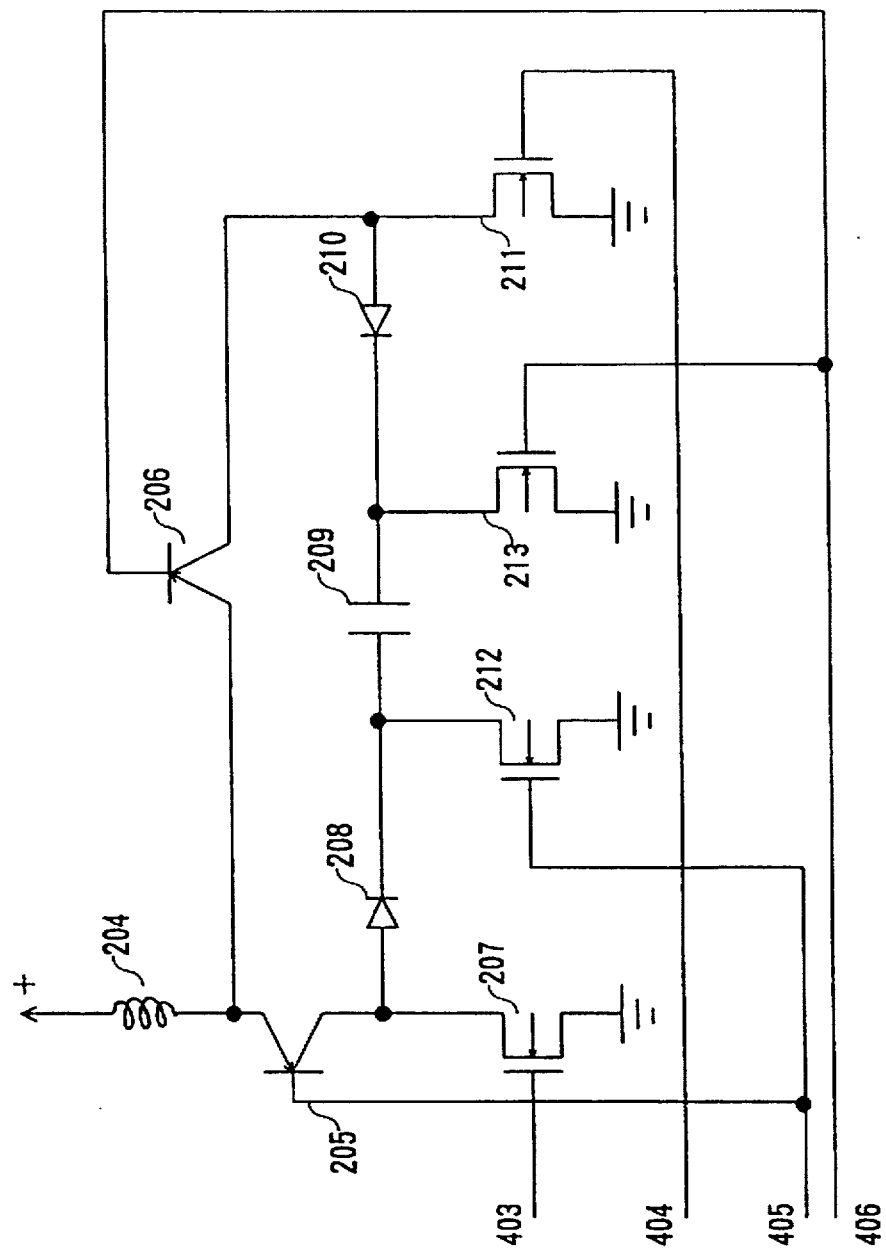
FIG. 2 is a circuit connection diagram around a step-up circuit of the embodiment of the present invention.

FIG. 2 shows an example of a driving circuit including a light emitting device.

Figure 3:
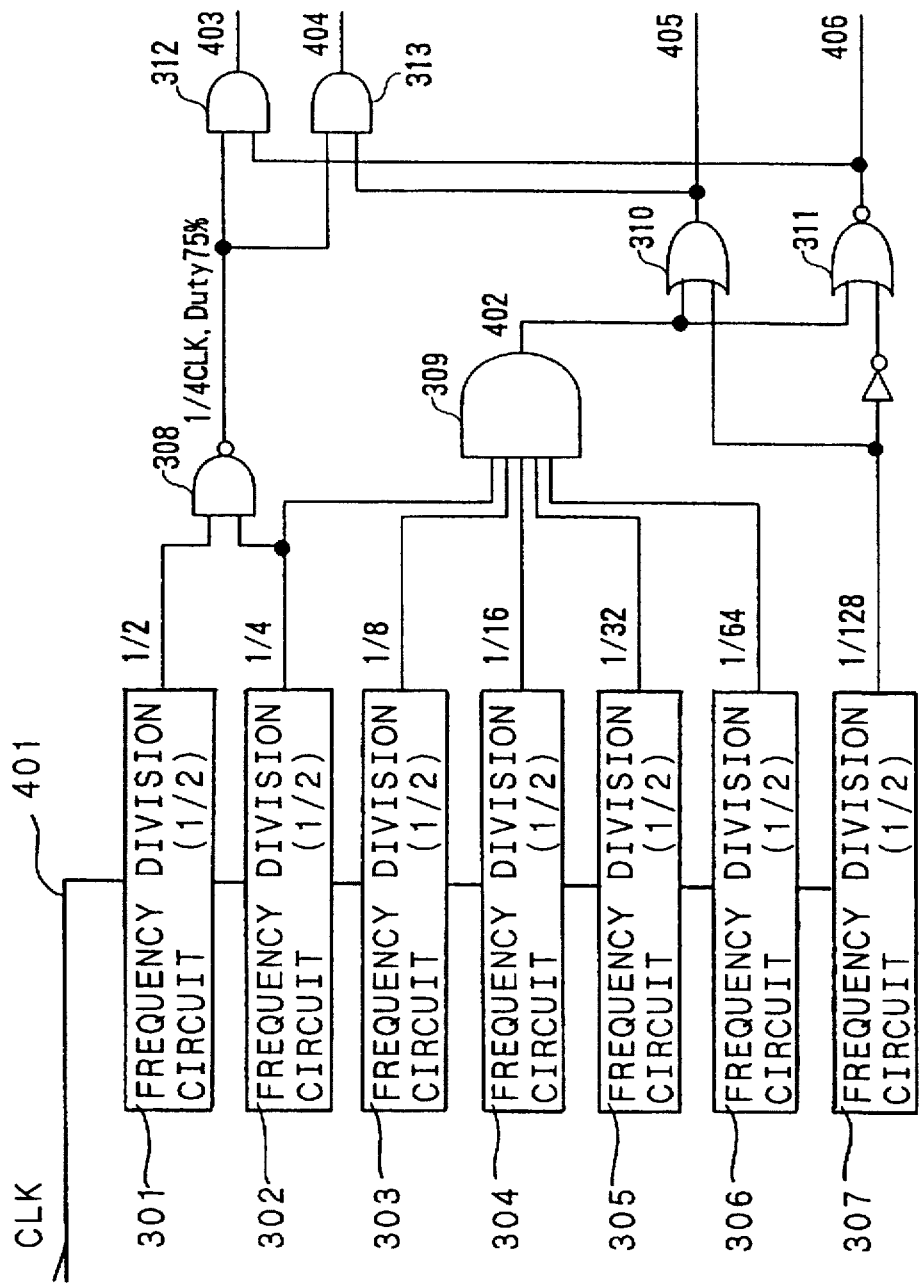
FIG. 3 is a circuit connection diagram around a timing control circuit of the embodiment of the present invention.

FIG. 3 shows an example of a logic circuit for controlling the driving circuit.

Figure 4:
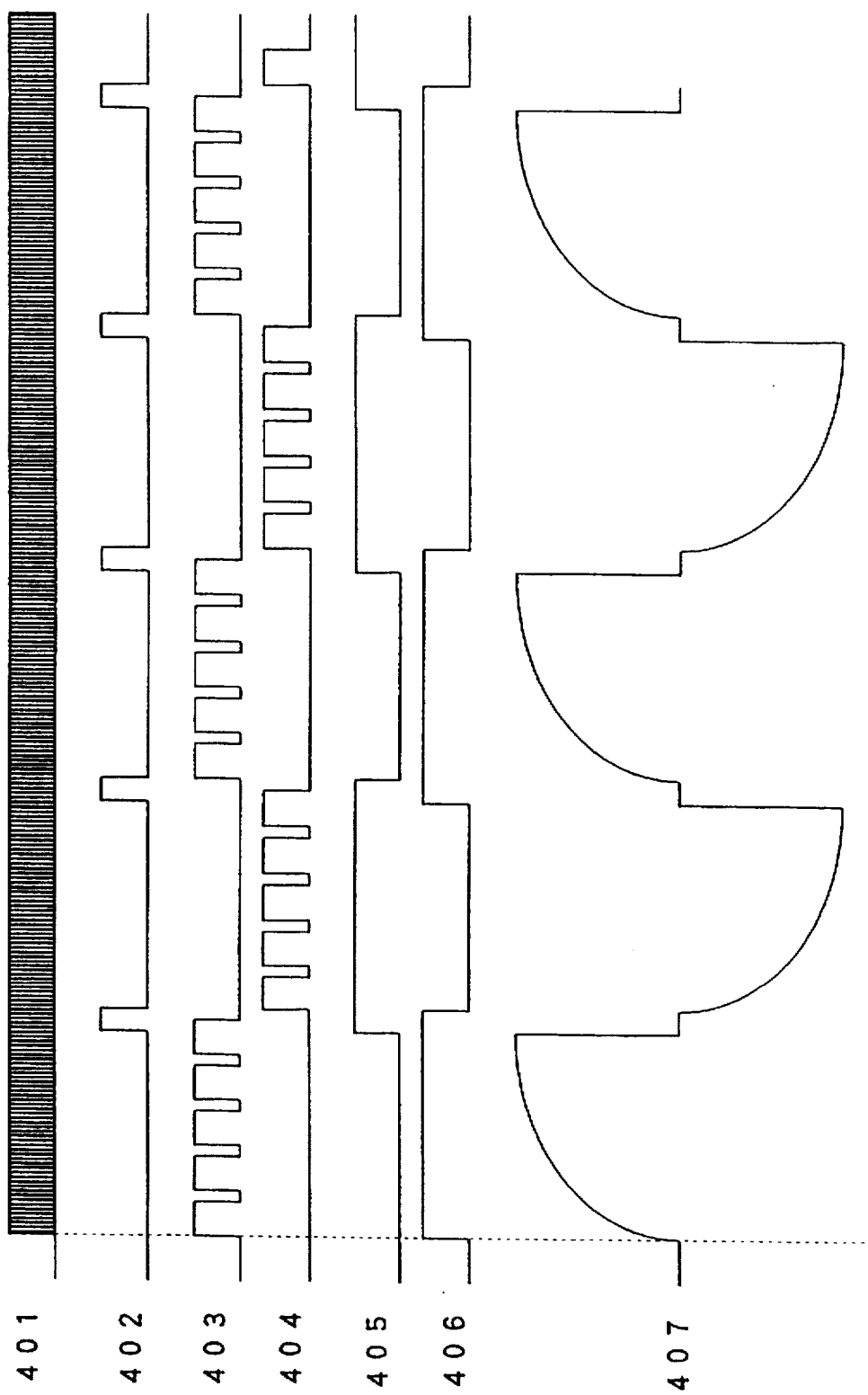
FIG. 4 is a timing chart showing the operation timing of the embodiment of the present invention and a charge/discharge waveform of an EL panel.

FIG. 4 shows the timing of the operations of the circuits in FIG. 2 and FIG. 3.

In FIG. 2, one of the terminals of a step-up coil 204 is always connected to a power supply. The other terminal of the step-up coil 204 is connected to a transistor 205 and a transistor 206 which correspond to the step-up selection Sways. The transistor 205 is controlled by a control signal 405. The transistor 206 is controlled by a control signal 406.

The control signal 405 also controls a MOS transistor 212 for charging and discharging an EL panel 209. Similarly, the control signal 406 also controls a MOS transistor 213 for charging and discharging the EL panel 209.

The power supply is activated, and an oscillation clock signal (CLK) 401 of 32 kHz is output by an oscillation circuit. The CLK 401 is input to a frequency division circuit 301 and is divided by frequency division circuits 302–307. Using the frequencies obtained by the frequency division, step-up clock signals 403, 404 and the control signals 405, 406 are synthesized as shown in FIG. 4 by gate circuits 309–313 shown in FIG. 3, respectively.

When the control signal 405 becomes a low level, the transistor 205 is turned on. When the transistor 205 is turned on, the step-up coil 204 and the step-up MOS transistor 207 are connected. The step-up clock signal 403 is output, with the step-up coil 204 and the step-up MOS transistor 207 connected. The step-up clock signal 403 causes the step-up MOS transistor 207 to be turned on and off repeatedly, thereby causing a step-up operation. The step-up operation of the step-up MOS transistor 207 produces a reverse induction voltage at the step-up coil 204. The step-up clock signals 403 and 404 used in the present embodiment are output at a frequency of 8 kHz and a duty of 75 %.

The reverse induction voltage generated by the step-up coil 204 is input to a diode 208. The diode 208 rectifies the input reverse induction voltage. The reverse induction voltage rectified by the diode 208 is input to the EL panel 209 to be charged and accumulated therein. At this time, the diode 208 prevents the accumulated charge from flowing back to the step-up coil.

The charging and accumulating operation in the EL panel 209 continues until the control signal 405 is switched from the low level to the high level and the output of the step-up clock signal 403 becomes the low level. When the step-up clock signal 403 becomes the low level, the step-up MOS transistor 207 is turned off. In the present embodiment, the control signals 405 and 406 are controlled at a cycle of 256 Hz.

When the control signal 405 is switched to the high level, the transistor 205 is turned off, and the MOS transistor 212 for discharge is turned on. When the MOS transistor 212 for discharge is turned on, the terminals of the EL panel 209 are both connected to ground and, at this time, the charge charged and accumulated until then is discharged entirely.

The timing at which both terminals of the EL panel 209 are connected to ground is within the period during which the signal 402 shown in FIG. 4 is at the high level. This period is kept long enough to allow the charge charged and accumulated in the EL panel 209 to be discharged completely. When the signal 402 is at the high level, both of the control signal 405 and the control signal 406 remain at the high level, and the step-up coil 204 is connected to neither the step-up MOS transistor 207 nor a MOS transistor 211.

Next, the control signal 406 becomes the low level, and the transistor 206 is turned on. When the transistor 206 is turned on, the step-up coil 204 and the step-up MOS transistor 211 are connected. The step-up MOS transistor 211 is controlled by the step-up clock signal 404.

When the step-up clock signal 404 is input to the step-up MOS transistor 211, the step-up MOS transistor 211 is repeatedly turned on and off, which results in a step-up operation. The step-up operation of the MOS transistor 211 produces a reverse induction voltage at the step-up coil 204. The produced reverse induction voltage is input to a diode 210 to be rectified. The rectified reverse induction voltage is input to the EL panel 209 to be charged and accumulated therein. The charging and accumulating operation in the EL panel 209 continues until the control signal 406 is switched from the low level to the high level and the output of the step-up clock signal 404 becomes the low level. When the step-up clock signal 404 becomes the low level, the step-up MOS transistor 207 is turned off.

When the control signal 406 is switched to the high level, the transistor 206 is turned off and the MOS transistor 213 for discharge is turned on. When the MOS transistor 213 for discharge is turned on, the terminals of the EL panel 209 are both connected to ground and the charge charged and accumulated until then is entirely discharged again.

As described above, the directions of the charging in and discharging from the EL panel 209 are switched by switching the control over the turning on and off of the transistors 205 and 206 using the control signals 405 and 406. In the present embodiment, the switching between the control signals 405 and 406 is performed at a cycle of 256 Hz. This operation is continuously performed and, as a result, the EL panel 209 emits light to serve as an illumination device. At this time, the peak voltage of a waveform 407 of the voltage charged in the EL panel is about 160–180 V peak-to-peak.

As described above, in a small hand-held electronic apparatus with a light emitting device such as an EL panel according to the present invention, the use of two step-up selection Sways allows bidirectional charging and discharging to be performed by a single step-up device on an EL panel. The use of such an EL panel driving circuit is advantageous in that a circuit can be made compact; the number of parts can be reduced; and an EL panel can emit light efficiently.

What is claimed is:

1. A small hand-held electronic apparatus with a light emitting device utilizing an emission of light caused by an application of an electric field comprising:

a light emitting device having at least two terminals for accumulating electrical charge injected by a high voltage pulse applied to one of said two terminals;

a step-up means having a step-up device for generating the high voltage pulse applied to said light emitting device in response to a predetermined drive frequency signal;

a step-up switching means for selecting either of the two terminals of said light emitting device to which the high voltage pulse generated by said step-up means is applied and for switching the terminal under application at predetermined intervals;

a plurality of discharge means connected to each of the two terminals of said light emitting device for selectively discharging the charge accumulated in said light emitting device from one of said two terminals at predetermined intervals;

a step-up frequency control means for generating the predetermined drive frequency signal input to said step-up means; and a charge/discharge frequency control means for generating a selection switching signal at predetermined intervals which controls said step-up switching means and a selection switching signal at predetermined intervals which controls said discharge means.

2. A small hand-held electronic apparatus with a field effect light emitting device according to claim 1, further comprising a rectifier means provided between said step-up means and said light emitting device for preventing the charge accumulated in said light emitting device from flowing back to said step-up means.

3. A small hand-held electronic apparatus with a field effect light emitting device according to claim 1, wherein said step-up means is provided at each of the two terminals of said light emitting device independently of each other; said step-up switching means is provided in association with each of said step-up means; and a first step-up switching means connects and disconnects a first step-up means and said step-up device while a second step-up switching means connects and disconnects a second step-up means and said step-up device.

4. A small hand-held electronic apparatus with a field effect light emitting device according to claim 1, wherein said charge/discharge frequency control means is configured to generate a selection switching signal having quiescent periods at predetermined intervals during the period after the application of the high voltage pulse to one of the terminals of said light emitting device and before the beginning of the application of the high voltage pulse to the other terminal.

* * * * *